Jan. 11, 1938. S. W. BRIGGS 2,105,136
OIL CLARIFIER AND FILTER
Filed July 27, 1933 5 Sheets-Sheet 1

Inventor
Southwick W. Briggs

By Mawhinney & Mawhinney,
Attorney

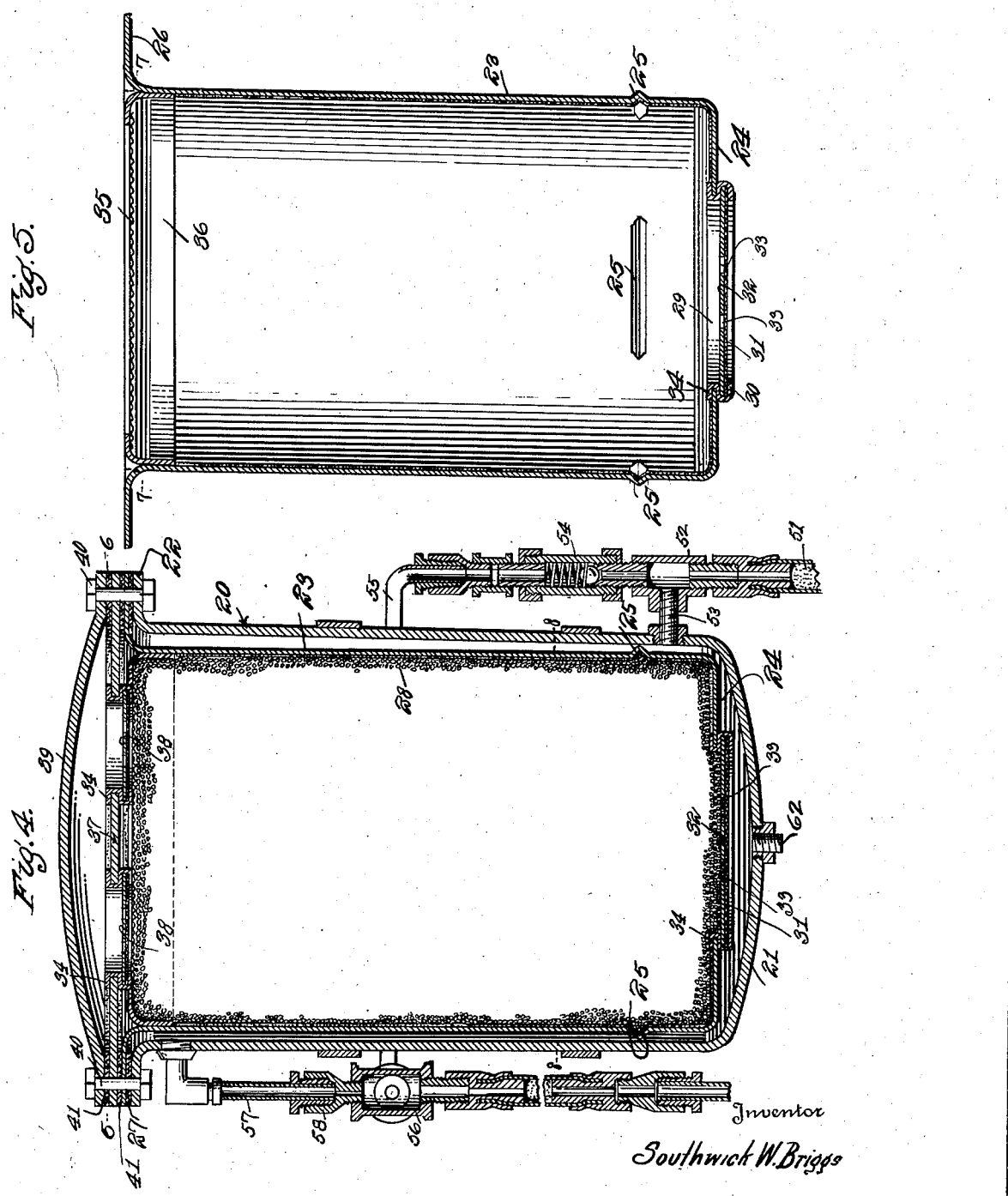

Jan. 11, 1938.　　　S. W. BRIGGS　　　2,105,136
OIL CLARIFIER AND FILTER
Filed July 27, 1933　　　5 Sheets-Sheet 3
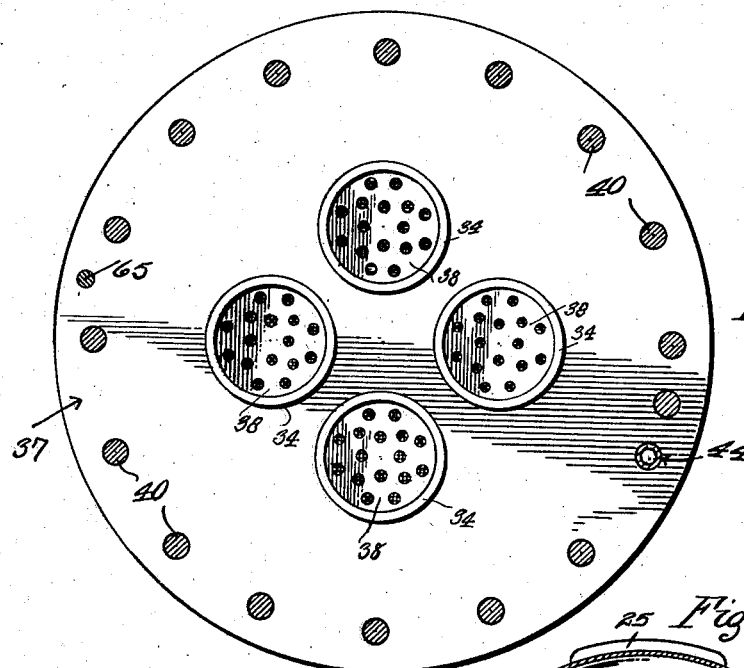
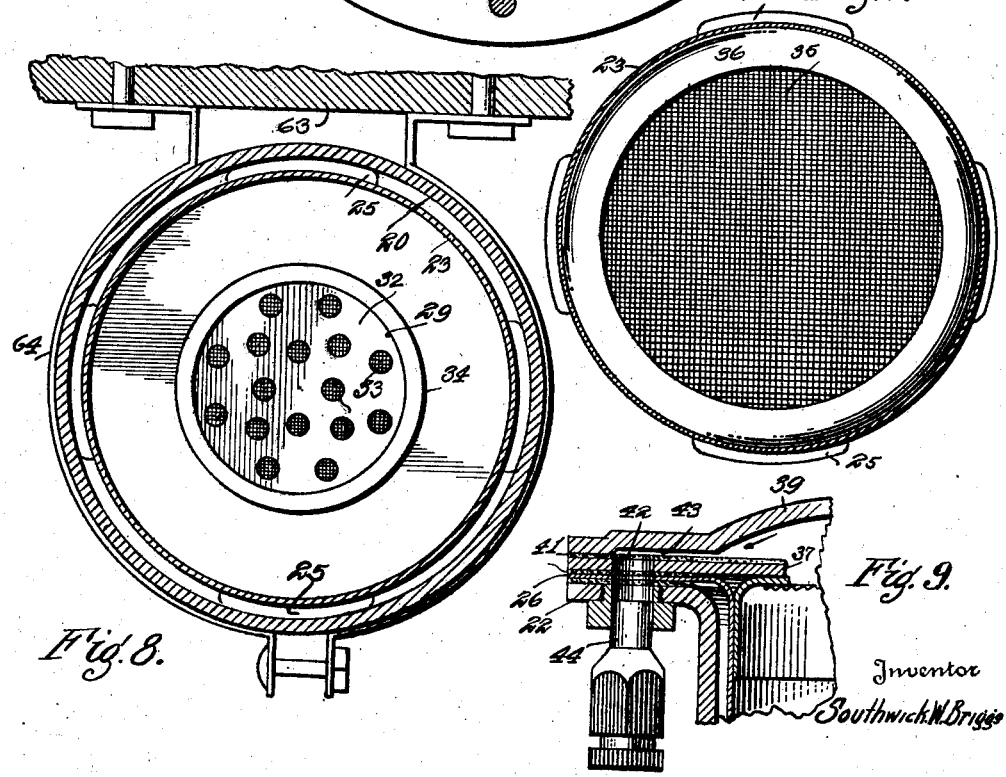

Jan. 11, 1938.     S. W. BRIGGS     2,105,136
OIL CLARIFIER AND FILTER
Filed July 27, 1933     5 Sheets-Sheet 4
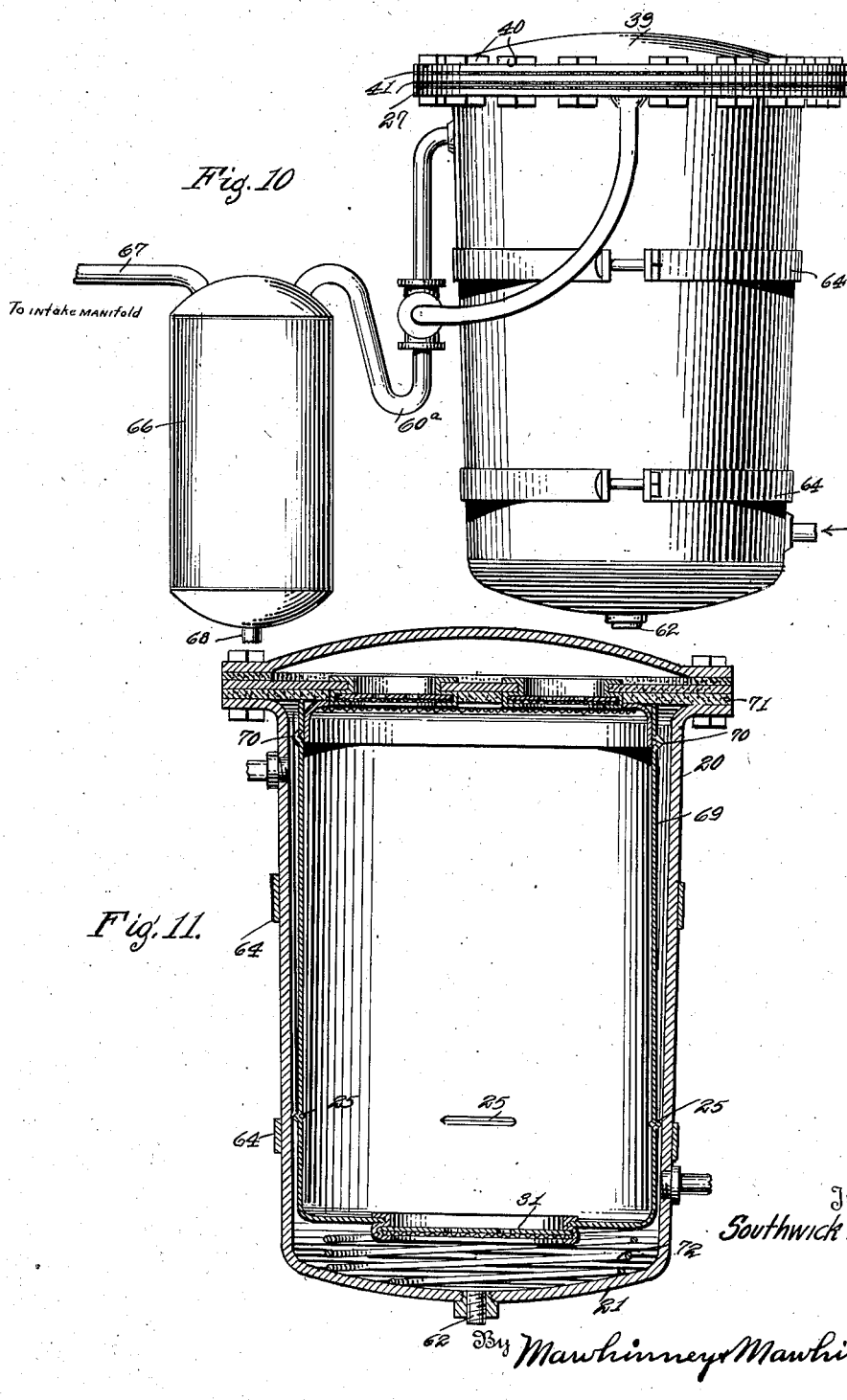

Jan. 11, 1938.　　　S. W. BRIGGS　　　2,105,136
OIL CLARIFIER AND FILTER
Filed July 27, 1933　　　5 Sheets-Sheet 5

Inventor
Southwick W. Briggs

By Mawhinney & Mawhinney,
Attorneys

Patented Jan. 11, 1938

2,105,136

UNITED STATES PATENT OFFICE 2,105,136

OIL CLARIFIER AND FILTER

Southwick W. Briggs, Glenmont, Md.

Application July 27, 1933, Serial No. 682,507

12 Claims. (Cl. 210—131)

The present invention relates to oil clarifiers and filters, and has for an object to provide a compact device of the pressure filter type which utilizes oil from the pressure line of an internal combustion engine crank case for the operation of the filter or clarifier.

Another object of the present invention is to provide an oil filter of this character with a jacket through which may be circulated a certain desired proportion of the oil in circuit for maintaining the filter at an even temperature, keeping the fuller's earth or other filtering material used from being chilled, admitting dissipation of excessive heat and for partly relieving and stabilizing the pressure of the oil fed through the filter.

The invention also aims to provide a jacketed container with a divided circuit of oil under pressure adapted to pass through the container and the filtering material therein and to also partially pass through the jacket, various relief valves and pressure reducing fittings being employed for maintaining the desired pressures at the different points required for insuring the proper distribution of the oil under pressure and to vent portions of the circuit when excessive pressure is built up.

The invention also aims at the provision of certain improved detail constructions of the container, filter head and screen mountings associated therewith for accomplishing the various purposes of the invention.

It is well known to those skilled in the art that new oil placed in the crank case of an internal combustion engine maintains its original viscosity for a short period of time only owing to the fact that in use in the engine a certain percentage of organic acid is formed. If this acid remains in the oil for any appreciable length of time it causes the breaking down of the oil at a rapid rate. The present invention is adapted to be continuously in circuit with the oil system and to remove the organic acid and other accumulations and foreign deposits from the oil to such a percentage as to prevent the accumulation becoming sufficient to break down the oil.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of an oil filter or clarifier embodying the features of the present invention, portions of a crank case being shown fragmentarily.

Figure 4 is an enlarged vertical section taken through the container and the parts adjacent thereto.

Figure 5 is a detail longitudinal sectional view taken through the inner receptacle or portion of the container and showing the screens applied thereto.

Figure 6 is a transverse section taken through the upper end of the container on the line 6—6 of Figure 4 looking down on the filter head.

Figure 7 is a transverse section taken through the upper end of the inner receptacle substantially on the line 7—7 of Figure 5.

Figure 8 is a transverse section taken through the intermediate portion of the container on the line 8—8 of Figure 4, showing the bottom filter screen in place.

Figure 9 is a fragmentary enlarged sectional view taken through the upper edge portion of the container and filter head, showing the take-off connection for the oil passing upwardly through the filtering material.

Figure 10 is a side elevation of a slightly modified form of the apparatus wherein a vacuum tank is included in the return pipe to assist in circulating the oil.

Figure 11 is a vertical section taken through a modified construction of container, showing a spring suspension means for the inner receptacle.

Figure 1:
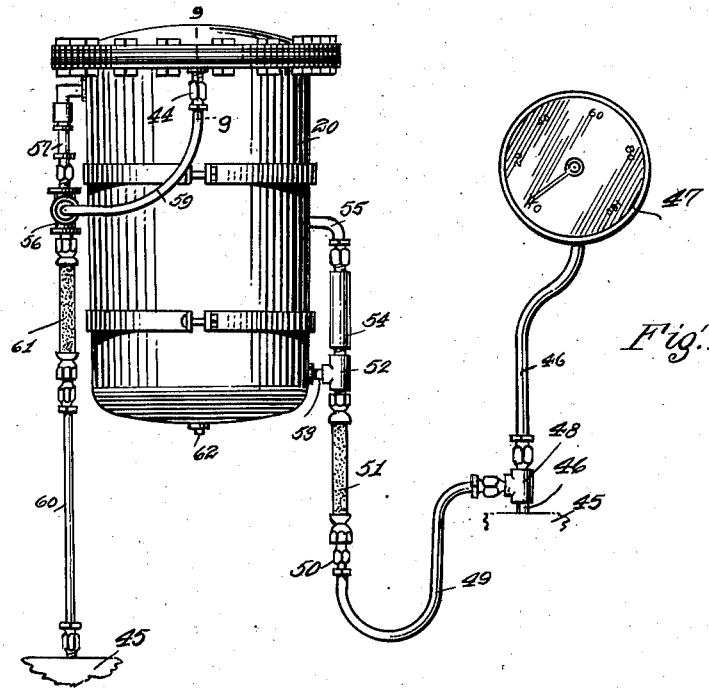
Figure 2:
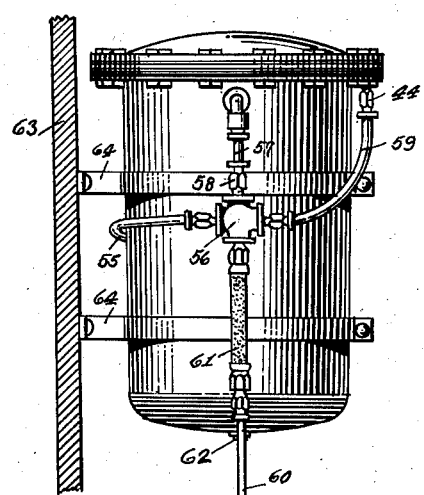
Figure 2 is a side elevation of the same, a dash board or other suitable support being shown in section.
Figure 3:
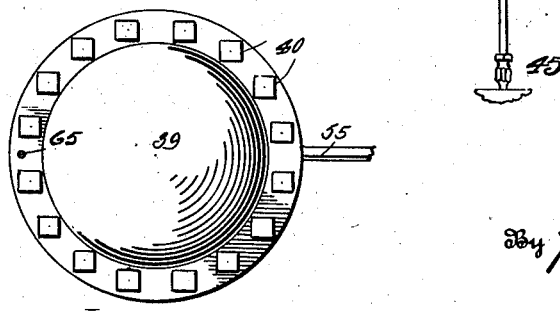
Figure 3 is a top plan view of the container.

Referring now to the drawings, and first to Figures 1 to 9, the filter comprises a container which has an outer jacket 20 provided with a closed bottom 21 which may be integral with the jacket and provided at its upper end with an outturned annular flange 22. Disposed concentrically and in spaced relation within the jacket 20 is a receptacle 23 preferably constructed of metal and which has a closed bottom 24 and which is provided with outwardly pressed bosses or projections 25 symmetrically disposed about the receptacle 23 for engaging the inner wall of the jacket 20 and maintaining the receptacle in uniformly spaced relation therefrom. The receptacle 23 is provided with an outturned annular flange 26 at its upper end by means of which the receptacle 23 may be suspended within the jacket 20 and with the bottom 24 of the receptacle in spaced relation to the bottom 21 of the jacket. As shown in Figure 4, a packing or washer 27 is interposed between the flanges 22 and 26 of the jacket and the receptacle so as to seal the space between the jacket and the receptacle at the upper end of the container.

Figure 13:
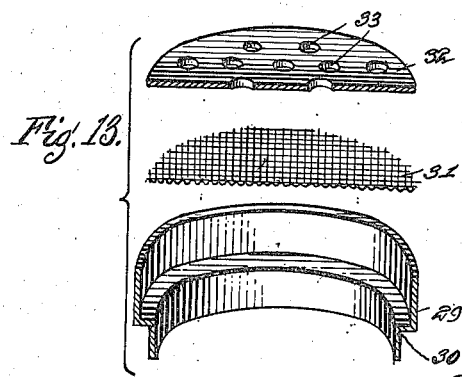
Figure 13 is a sectional perspective view of one of the screens employed, with the parts separated and ready for assembly.

The receptacle 23 is adapted to carry a body of filtering material 28 which may be fuller's earth and which is preferably placed in the container in accordance with my Patent No. 1,860,229, granted May 24, 1932, and wherein the outer coating of the filtering material is secured by shellac or other suitable adhesive against the inner wall of the receptacle 23 to prevent seepage of oil under pressure upwardly between the body of filtering material 28 and the wall of the receptacle 23. The bottom of the receptacle 23 is provided with a central opening which is closed by a filtering screen upwardly through which oil under pressure is adapted to pass as shown to advantage in Figure 13, this filtering screen may comprise a ring 29 arranged to fit through the opening in the bottom 24 of the receptacle, and which is provided with a lower flange or shoulder 30 against which is seated a wire mesh screen 31 of desired size and which is braced and supported by an overlying disc 32 having a plurality of apertures 33 therein for insuring the proper distribution of the oil passing through the screens. As shown in Figure 5 particularly, the wire mesh 31 rests upon the shoulder or flange 30 and the disc 32 is fitted into the ring 29 over the wire mesh 31, and the upper portion of the ring is then crimped and rolled to provide a double flange 34 adapted not only to secure the screen and the disc together but to also engage about the marginal edge of the bottom 24 for holding the screen in place.

The upper end of the receptacle 23 is closed by a wire screen 35 of suitable mesh and which is soldered or otherwise suitably secured to a rim 36 which is fitted into the upper end of the receptacle 23 for holding the filtering material 28 in the receptacle.

A filter head, shown to advantage in Figures 4 and 6, is placed upon the upper end of the receptacle 23 and is supported across the receptacle by the outturned flanges 22 of the jacket 20. This head comprises a disc 37 having an outer diameter corresponding to that of the flanges 22 and 26 and which is provided with a desired number of apertures therethrough, four being shown in the present instance, preferably arranged in symmetrical order near the central portion of the head. Each opening of the disc 37 is closed by a reinforced screen 38 constructed in accordance with the showing in Figures 5 and 13, and wherein the double flanges 34 are overturned about the marginal edges of the opening in the disc or head 37.

A dome or cover plate 39 is fitted over the filter head 37 and has an outer diameter equal substantially to that of the flanges 22 and 26, and which is arched or domed upwardly at its intermediate portion to provide an ample space within which may accumulate the oil under pressure, and to admit of the spreading of the oil equally over the upper surface of the filter head so that the oil may be carried off at one side, as shown in Figure 9.

The dome 39, the filter head 37 and the flanges 22 and 26 are all clamped together in superposed relation by a circular series or row of bolts 40 having the usual nuts thereon for drawing the bolts tight about the head of the filter and sealing all of the parts together. The filter disc or head 37 may be provided with packing washers 41 at opposite sides thereof and at the peripheral or outer edge portion of the head as shown to advantage in Figure 4.

At one side of the container, as shown in Figure 9, the various parts associated with the head 37 are provided with registering openings 42 and the dome 39 is provided in registry with the openings 42 with a radial groove or recess 43 in its under side through which oil may pass from the dome into the openings 42. A pipe coupling 44 is secured in the flange 22 of the jacket in registry with the openings 42 so that oil may pass outwardly through the openings 42 and through the pipe coupling 44 from the dome.

As shown in Figure 1, the device is adapted for use in connection with the crank case 45 of an internal combustion engine or the like and from the crank case rises a pressure pipe 46 which leads from the oil pump of the crank case and which is provided with a pressure gauge 47 to indicate the pressure of the oil from the pump.

This pipe 46 is provided with a T-coupling 48 carrying a feed pipe 49 which leads to the filter. The feed pipe 49 is provided with a reducing fitting 50 having a drill hole of No. 50 drill hole or thereabout to control the volume of the oil passing to the filter. The pipe 49 may also be provided with a flexible hose section 51 therein for absorbing vibrations between the parts connected to the crank case 45 and the container of the filter. The pipe 49 is provided with a T-coupling 52 the main branch of which is connected through a spud 53 or the like with the side of the jacket 20 near the bottom thereof, as shown in Figure 4. The opposite branch of the T-coupling 52 carries a relief valve 54 which may be of the spring check type, shown in Figure 4, for relieving oil under excessive pressure for passage through a relief pipe 55 which extends from the upper end of the relief valve 54 as shown. The relief pipe 55 is preferably carried around to the side of the container and thereat is connected into one branch of a four-way coupling 56. The upper branch of the coupling 56 is connected by a pipe 57 through the wall of the jacket 20 near the top thereof, as shown in Figure 4, and at a point diametrically opposite to the entrance spud 53 near the lower end of the jacket. The pipe 57 is provided with a reducer 58 having a drill hole therein of approximately No. 60 drill hole so as to check the out-flow of the oil from the jacket of the container.

The other horizontal branch of the four-way coupling 56 is connected by a pipe 59 to the outlet coupling 44 which leads from the dome of the container so that oil in the dome may pass directly to the four-way coupling 56. The lower branch of the four-way coupling 56 is connected by a pipe 60 with a flexible section 61 therein, to the return portion of the crank case 45.

The container may be provided, in the bottom of the jacket 20, with a drain plug 62 or the like for removing water, sediment and the like which may be extracted by gravity from the oil.

The container may be mounted upon any suitable relatively solid support, such as the dash board 63 of a motor vehicle by means of bracket bands or straps 64 adapted to encircle the container about the jacket 20, and which may be provided with bolts or any other suitable devices for securely holding the container at the desired height.

As shown in Figure 6, the several parts comprising the head of the container or filter are guided into and maintained in register by means of a pilot pin 65 which may be secured to the out-turned flange 22 of the jacket 20 for receiving thereover the suitable apertured flanges, discs, washers and the like of which the head is composed. It is important to properly register these parts so that the openings 42 which are formed in these parts will be brought into proper register with the outlet pipe coupling 44.

In the modification shown in Figure 10, the return pipe 60ᵃ instead of going directly to the crank case 45, is connected to an intake portion at the upper end of a vacuum tank 66. The tank 66 is connected by a pipe 67 to the intake manifold of an engine for operating the tank 66 in the usual manner. The oil released from the tank 66 may then be returned through the pipe 68 to the crank case 45. The vacuum tank 66 thus aids in the feeding or discharge of the oil through and from the filter.

In the modification shown in Figure 11, the inner receptacle 69 is provided not only with the lower spacing bosses or projections 25, but also with upper bosses or projections 70 adapted to center the upper end of the receptacle 69 in the jacket 20. The receptacle 69 has no outturned flange at its upper end and seats directly against the lower side of a packing washer 71, which extends inwardly from the marginal edge of the head to an appreciable extent for overlapping the upper end of the receptacle 69. The receptacle 69 is yieldingly held upwardly against the washer 71 by means of a coil spring 72 or the like mounted in the bottom 21 of the jacket and which is of sufficient diameter to lie about the bottom screen 31 of the receptacle.

Figure 12:
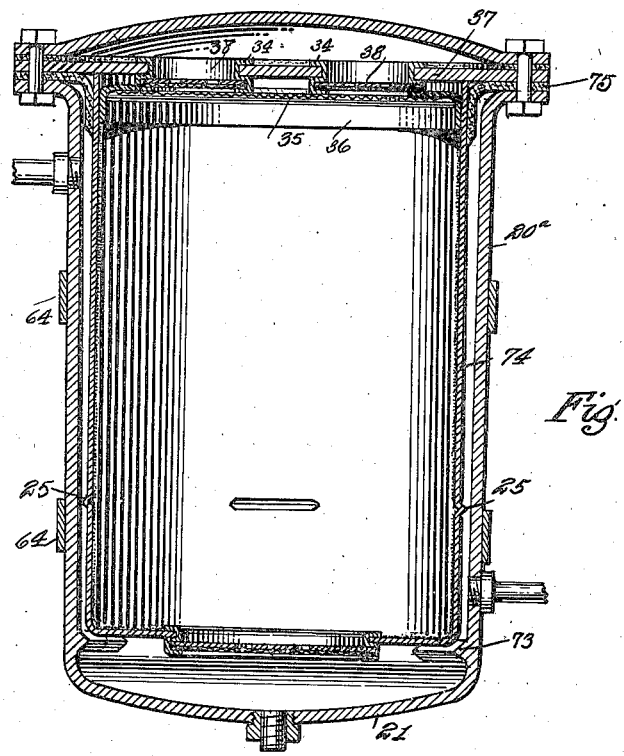
Figure 12 is a vertical section taken through another modified form of container.

In the modification shown in Figure 12, the jacket 20ᵃ is provided in spaced relation to its bottom 21 with inwardly extending cleats, bosses or projections 73 adapted to underlie the inner receptacle 74 to hold it above the bottom of the jacket.

The upper end of the receptacle 74 engages the under side of the filter head 37 and is held in place at its upper end by means of a downwardly flanged packing washer 75 clamped between the flanges of the head and engaging the exterior surface of the receptacle 74, as shown in Figure 12.

In the operation of the filter, oil under pressure passes from the pressure pump pipe 46, through the feed pipe 49 and through the spud 53 into the lower end of the jacket 20. If undue resistance is offered to the entrance of the oil into the lower end of the jacket 20 the relief valve 54 opens and the excess oil passes through the relief pipe 55 into the four-way coupling 56 and from this point downwardly through the pipe 60 to the crank case 45.

Oil entering through the spud 53 passes downwardly into the bottom of the jacket 20, and also upwardly against the opposite sides of the jacket and all about the inner receptacle 23. The oil which passes through the annular compartment or space between the jacket and the receptacle, first serves to heat the container and the filtering material therein. This oil also serves when in the jacket to dissipate excessive heat and to maintain more constant the desired temperature within the filter. The oil passes out of the upper end of the jacket 20 through the pipe 57 and back to the return coupling 56.

This out-flow of oil is retarded to some extent by the reduction coupling 58 so as to exert a desired pressure on the oil for passage upwardly through the filtering material 28. The oil in the bottom of the jacket 20 passes upwardly through the bottom screen 31 through the body of filtering material 28 and thence upwardly through the top screen 35 of the receptacle and through the variously spaced apart and arranged top or head screens 38. The oil now enters the dome 39 and is delivered therefrom through the channel or groove 43, through the openings 42 and outwardly through the pipe coupling 44, pipe 59 and to the return coupling 56. The oil passes back to the crank case through the pipe 60 and this oil circuit is maintained during the operation of the engine so that the oil is continuously relieved of its organic acid and preserved indefinitely from cracking. The oil is also maintained at a desired working temperature and is protected against excessive heat.

The filter may be readily cleansed and the material 28 may be readily interchanged by merely opening the head of the filter and interchanging the receptacle 23 therein without disturbing the other parts of the apparatus.

It is obvious that various changes and modifications may be made in the details of construction and design of the above specifically described embodiment of this invention without departing from the spirit thereof, such changes and modifications being restricted only by the scope of the following claims:—

What is claimed is:—

1. In a pressure filter, a container having a jacket thereabout and opening at one end into the jacket, a liquid pressure feed pipe opening into the jacket to feed liquid under pressure through the jacket to regulate the temperature of the container and through the container, a filtering body in the container to filter the liquid passing therethrough, a return pipe connected to the jacket to carry off the liquid passing therethrough, a reducer in the return pipe for checking the passage of liquid through the jacket and increasing the pressure of the liquid therein to force a desired proportion of the liquid through the container, and a second return pipe leading from the other end of the container to take off the filtered liquid.

2. In a pressure filter, a jacket open at its top, a filtering container projecting down into the jacket and sealed thereagainst at its upper end, a screen disposed in the bottom of the container and opening the latter into the bottom of the jacket, a top screen structure disposed against the upper end of the container, a dome over the screen structure, liquid pressure means connected to the lower portion of the jacket, a return pipe having a branch opening into the upper portion of the jacket and having another branch opening into the dome, and back pressure means in the first branch to insure passage of a proportion of the liquid through the filtering container.

3. In a pressure filter, a supporting wall, a ring fitted through the wall and having a substantially S-shape cross section having an outturned flange at one end embracing the marginal edge of the supporting wall and having an inturned flange at its other end providing an annular groove, a screen disc seated in the groove, and a perforated plate seated in the groove overlying the screen.

4. In a pressure filter, a screen carrying ring having an intermediate ledge portion with oppositely overturned flanges providing an outwardly facing groove at one end for receiving a ring support therein and an inwardly passing groove at its other end, a screen disc seated in the inwardly facing groove, and a perforated supporting disc also seated in the inwardly facing groove over the screen for strengthening the same and spreading the liquid passing through the screen.

5. In a pressure filter, a filtering container, liquid pressure means for forcing liquid into one end of the container, a plate secured over the other end of the container and having spaced openings therethrough, a dome on the plate to receive and carry off the filtered liquid, a ring fitted through each opening of the plate and having each a flange at one end overturned on the plate to hold the ring thereto, each ring also having an inturned flange at its other end providing an inwardly facing annular groove, screen discs fitting in the grooves of the rings, and liquid dispersing perforated discs overlying the screen discs and also seated in the grooves of the rings.

6. In a pressure filter, a jacket open at its top and having an out-turned flange thereat, a filtering container fitted downwardly in the jacket and having an out-turned flange overlying the jacket flange, a filter plate extending over the container and having a marginal edge portion overlying the container flange, a dome extending over the filter plate to receive liquid passing upwardly through the plate, said dome having a marginal flange overlying the marginal edge portion of the plate, liquid pressure means opening into the lower end of the container for supplying liquid thereto, and a return pipe connected to the jacket flange at the side of the jacket, said jacket and container flanges and said marginal edge portion of the plate having registering liquid return openings therethrough and said dome flange having a slot in its under side leading from the interior of the dome to said openings for conducting liquid from the dome to said return pipe.

7. In a pressure filter, a jacket, a filter container spaced within the jacket and having centering means near its lower end and sealing means between the container and jacket at its upper end, a liquid pressure pipe opening into the lower end of the jacket, a reducer in said pipe for controlling the flow of liquid to the jacket, a return pipe leading from the upper end of the jacket for circulating liquid through the jacket, a back pressure device in the pipe for directing a portion of the liquid upwardly through the container, a dome enclosing the top of the container to receive liquid therefrom, an outlet branch pipe between the dome and the return pipe beyond the back pressure device for circulating a proportion of the liquid through the container, and a pressure relief by-pass between said liquid pressure pipe and said return pipe beyond the back pressure device.

8. In a filter, a casing, means for feeding a fluid to be treated to one portion of the casing, a restricted outlet connected to another portion of the casing for carrying off a portion of the fluid fed thereto, a second outlet connected to another portion of the casing for carrying off filtered fluid therefrom, and a filtering element removably mounted in the casing and having an inlet portion open to said fluid feeding means and an outlet portion open only to said second outlet for filtering the fluid passing through the filtering element between said inlet and outlet, said filtering element having imperforate side portions of less dimensions than that of the casing to admit passage of a portion of the fluid to be filtered from said fluid feeding means about the filtering element and out through said restricted outlet for heating the filtering element to and maintaining the same at substantially the temperature of the fluid being treated.

9. In a filter, a casing having a flanged open top and a removable dome cover therefor, pressure feeding means for fluid to be filtered connected to the lower portion of the casing, a fluid outlet opening into the dome cover of the casing to carry off filtered fluid, a second fluid outlet opening into the casing below the flange, and a filtering element having a flange on its upper end removably sealed between the casing flange and the cover for suspending the filtering element in the casing, said filtering element having an imperforate side wall and an inlet opening in its bottom and an outlet opening in its top, whereby fluid under pressure from the bottom of the casing may enter the bottom of the filtering element and pass therethrough to the dome and the first outlet and a portion of the fluid in the casing may circulate around the filtering element and through the second outlet for maintaining the filtering element at the temperature of the fluid being treated.

10. In a pressure filter, a casing, a filtering element removably mounted in the casing and being of less diameter than the interior of the casing to provide a jacket about the filtering element, said filtering element having bottom and top openings therein, fluid feeding means for feeding fluid under pressure into the lower part of the casing for passage through the filtering element and through the jacket for maintaining the filtering element at substantially the temperature of the fluid and for filtering a portion of the fluid, outlet means in the side of the casing for passage of fluid from the jacket, a second outlet means connected to the upper part of the casing and opening above the filtering element, and a removable dome cover for the casing to close in the top of the filtering element and open to said second outlet means for collecting the filtered fluid and directing the same to said second outlet.

11. In a pressure filter, an open topped casing with an outturned flange, means for feeding fluid under pressure to the lower portion of the casing, outlet means connected to the upper portion of the casing to carry off a portion of the fluid from the casing, a second outlet means opening upwardly through the flange of the casing, a removable dome supported on the casing flange and opening into the second outlet means, and a removable filtering element having a flange at its upper end sealed between the casing flange and the dome, said filtering element having perforate lower and upper end portions for receiving fluid under pressure from the lower end portion of the casing and delivering filtered fluid to the dome and the second outlet carried by the casing flange, said filtering element also having an imperforate side wall for contact with a portion of the fluid passing to the first outlet means of the casing to maintain the filtering element at substantially the temperature of the fluid.

12. In a pressure filter, a casing having an outturned flange at its open top, a filtering element removably disposed in the casing and having an outturned flange supported and sealed upon the casing flange, fluid feeding means connected to the lower portion of the casing to feed fluid under pressure to the filtering element in the casing, a removable dome cover overlapping the flanges and closing the casing and the upper end of the removable filtering element, and an outlet device carried solely by the casing flange and opening upwardly into the dome cover for carrying off filtered fluid collected in the dome cover.

SOUTHWICK W. BRIGGS.